(12) United States Patent
Vaswani et al.

(10) Patent No.: US 6,333,746 B1
(45) Date of Patent: *Dec. 25, 2001

(54) AUTO LEVEL OF DETAIL TEXTURE MAPPING FOR A SOFTWARE GRAPHICS ENGINE

(75) Inventors: Gautam P. Vaswani, Austin; Daniel Wilde, Cedar Park, both of TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/965,381

(22) Filed: Nov. 6, 1997

Related U.S. Application Data (63) Continuation-in-part of application No. 08/948,626, filed on Oct. 10, 1997, and a continuation-in-part of application No. 08/774,787, filed on Dec. 30, 1996, now Pat. No. 5,835,097.

(51) Int. Cl.$^7$ ................................................. G06T 11/40
(52) U.S. Cl. .................. 345/582; 345/428; 345/581; 345/589
(58) Field of Search ..................... 345/428, 430, 345/431, 429, 581, 582, 589

(56) References Cited

U.S. PATENT DOCUMENTS

| | | | |
|---|---|---|---|
| 4,583,185 | 4/1986 | Heartz | 364/521 |
| 4,586,038 | 4/1986 | Sims et al. | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,868,771 | 9/1989 | Lee et al. | 364/578 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 4,974,176 | 11/1990 | Buchner et al. | 364/522 |
| 5,126,726 | 6/1992 | Howard et al. | 340/728 |

(List continued on next page.)

FOREIGN PATENT DOCUMENTS

9636011   11/1996   (WO) .

*Primary Examiner*—Mark Zimmerman
*Assistant Examiner*—Kimbinh T. Nguyen
(74) *Attorney, Agent, or Firm*—Jonathan M. Harris; Robert Platt Bell; Steven Lin (57) ABSTRACT

A graphics system includes a graphics controller for rendering polygons with texture using an improved MIP mapping technique. The graphics controller includes a polygon engine for rendering the pixels in a polygon and a texture map engine for selecting texture elements ("texels") from an appropriate texture map to be applied to the pixels rendered by the polygon engine. The texture map engine generates texel coordinate values from pixel coordinate values provided by the polygon engine. The appropriate texture map is selected from a set of texture maps each varying from the others by the level of detail of the texture in each map. The graphics controller selects the appropriate level of detail texture map to use to increase speed, efficiency, and realism quality of the graphics system. The determination as to which level of detail texture map is appropriate is made by computing the area bounded by adjacent texel coordinates generated by the texture map engine. In one embodiment, vectors are defined for each the adjacent texels and the area is determined from the magnitude of the cross product of the vectors. An embodiment of the invention includes software for calculating the area bounded by adjacent texel coordinates and for comparing the area to a range of values. The software also selects an appropriate texture map based on the results of the comparison.

26 Claims, 8 Drawing Sheets

U.S. PATENT DOCUMENTS

| | | | |
|---|---|---|---|
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,786,822 * | 7/1998 | Sakaibara et al. | 345/430 |
| 6,005,582 * | 12/1999 | Gabriel et al. | 345/430 |

* cited by examiner

AUTO LEVEL OF DETAIL TEXTURE MAPPING FOR A SOFTWARE GRAPHICS ENGINE

CROSS-REFERENCE TO RELATED APPLICATIONS

This application is a continuation-in-part of application Ser. No. 08/948,626 filed Oct. 10, 1997, entitled "Auto Level Of Detail-Based MIP Mapping In A Graphics Processor" and application is also a Continuation-In-Part of U.S. patent application Ser. No. 08/774,787, filed Dec. 30, 1996, now U.S. Pat. No. 5,835,097 issued Nov. 10, 1998.

STATEMENT REGARDING FEDERALLY SPONSORED RESEARCH OR DEVELOPMENT

Not applicable.

BACKGROUND OF THE INVENTION

A. Field of the Invention

The present invention relates generally to a graphics system for a personal computer. More particularly, the present invention relates to rendering polygons in a pixel grid. Still more particularly, the present invention relates to an improved method of applying texture to polygons.

B. Background of the Invention

Sophisticated graphics packages have been used for some time in expensive computer aided drafting, design and simulation systems. Increased capabilities of graphic controllers and display systems, combined with standardized graphics languages, have made complex graphics functions available in even the most routine applications. For example, word processors, spread sheets and desktop publishing packages now include relatively sophisticated graphics capabilities. Three-dimensional (3D) displays have become common in games, animation, and multimedia communication and drawing packages.

The availability of sophisticated graphics in PC's has driven a demand for even greater graphic capabilities. To obtain these capabilities, graphic systems must be capable of performing more sophisticated functions in less time to process greater amounts of graphical data required by modern software applications. In particular, there is a continuing need for improvements in software algorithms and hardware implementations to draw three=dimensional objects using full color, shading, texture mapping, and transparency blending.

The development of raster display systems has dramatically reduced the overall cost and increased the capabilities of graphic systems. In a raster display system, a set of orthogonal or horizontal scan lines, each comprising a row of pixels, forms an array or grid of pixels to represent the entire screen area. The screen preferably comprises a cathode ray tube (CRT), LCD display, or the like, capable of scanning the entire pixel grid at a relatively high rate to reduce flicker. The pixel data preferably is stored in a frame buffer comprising dynamic random access memories (DRAM's), or more preferably video RAMs (VRAM's), where each pixel is represented by one or more bits depending upon the desired resolution. In many graphics systems, for example, each pixel is drawn or "rendered" with 24 bits of color information (8 bits for red, 8 bits for green, 8 bits for blue). Typical display systems are capable of drawing screens with multiple colors at a variety of screen resolutions, including resolutions of 640 pixels×480 pixels, 800×600, 1024×768, 1280×1024, or even higher pixel value combinations, depending upon the software drivers and the hardware used.

Typically, a video controller scans and converts the pixel data in the frame buffer to provide control signals for the screen system. In particular, the video controller renders the screen pixels, typically from the top of the screen to the bottom and from left to right, converting pixel data into color intensity values each pixel. In a color graphics system using a CRT, three separate beams are controlled for each of the primary colors, where the intensity of each of the beams is determined by the pixel value corresponding to the respective colors. A similar system is used for LCD displays.

Other improvements have been made in the hardware realm. Graphics processors and accelerators are available with software drivers that interface the host central processing unit (CPU) to the graphics processor. In general, the software driver receives information for drawing objects on the screen, calculates certain basic parameters associated with the objects and provides these to the graphics processor. The software driver then sends a command for the graphics processor to draw the object into the frame buffer. A graphics processor may use interpolation techniques in which the fundamental information for the object to be drawn comprises a set of initial and incremental parameters. As explained below, the graphics processor loads or otherwise receives the initial parameters for rendering a first pixel, and then interpolates the remaining pixels in an object by using the incremented parameters until the object is complete.

Figure 1:
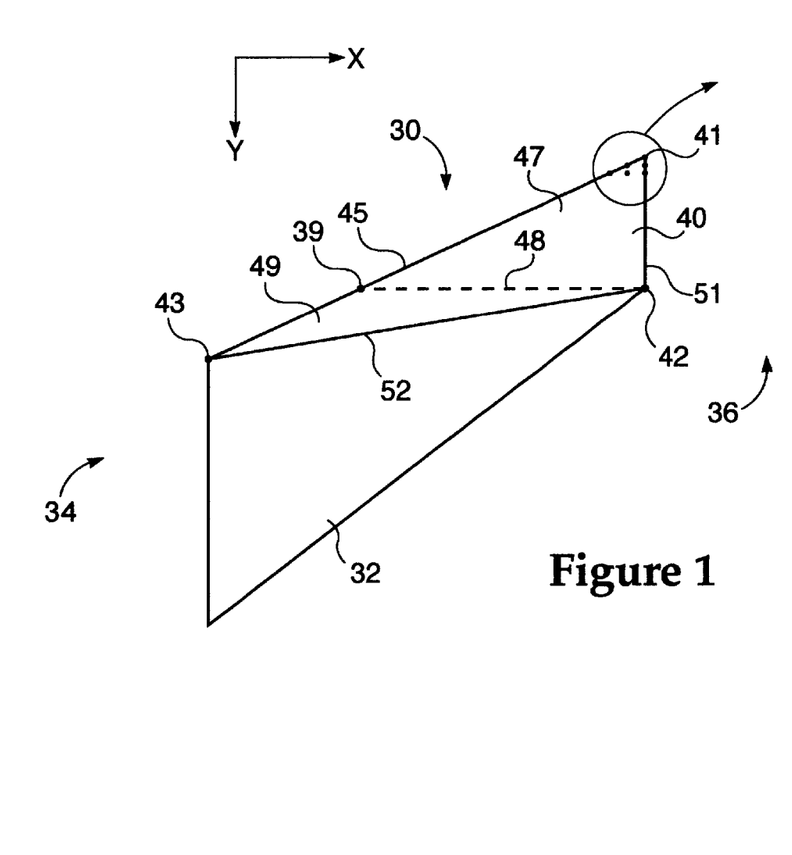
FIG. 1 is an exemplary polygon representing a wall drawn with perspective in a graphics system.
Figure 1A:
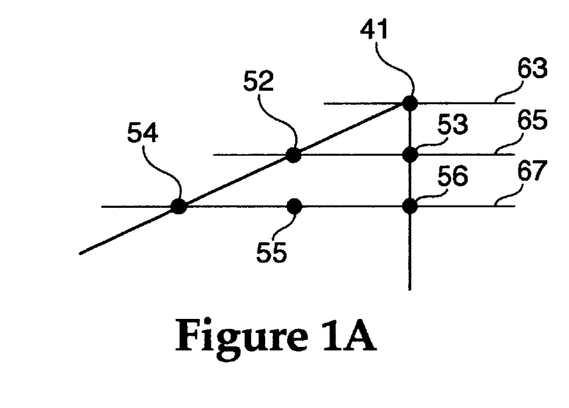
FIG. 1A is a blow-up of a portion of the wall of FIG. 1.

An exemplary interpolation method for drawing a typical polygon is shown in FIG. 1 in which polygon 30 represents a wall extending from the foreground 34 to the background 36. Polygon 30 can be subdivided into two triangles 32 and 40. In general, however, a polygon is subdivided into as many triangles as are necessary to represent the polygon. For example, ten thousand triangles or more may be required to create a realistic looking image of a human face. Graphics objects typically are represented with a collection of triangles because triangles are simple geometric shapes that can be characterized with relatively few values.

Referring still to FIG. 1, each triangle 32, 40 may be drawn in two portions, such as portions 47, 49 of triangle 40. To render triangle 40, for example, a software driver receives vertex information (including x,y coordinates of each vertex 41, 42, 43) and identifies a main slope line 45 extending the vertical length (in the y direction) of triangle 40 between vertices 41 and 43. The other two sides 51, 53 of triangle 40 are referred to as opposite slopes. The polygon 40 is interpolated using orthogonal (ORTHO) horizontal scan lines of pixels that extend from the main slope 45 to the opposite edges 51, 53. ORTHO Scan lines 63, 65, 67 represent the first three scan lines for triangle 40. The vertical or y parameter is used as a reference coordinate, so that the y pixel value is preferably incremented (or decremented depending on whether the triangle is rendered from top to bottom or bottom to top) by one for each scan line. A value for the main slope 45 is calculated as an initial condition and is used to compute the x coordinate of the first pixel in each scan line (i.e., the pixels on of the main slope). The software driver also determines initial and incremental width values for the scan lines and interpolates the width rather than edge walking the opposite slopes. The interpolated width value is loaded into a counter and decremented for each pixel in the current scan line. When the width counter becomes zero or otherwise reaches terminal count, the counter asserts a terminal count signal indicating that the scan line is complete.

Using such interpolation techniques, each triangle 32, 40 is drawn one row or horizontal scan line of pixels at a time.

For each scan line of triangle 40 (such as scan lines 63, 65, 67), pixels are rendered from the main slope 45 to the opposite edges 51, 53. In the first scan line 63, vertex pixel 41 is rendered. In the second scan line 65, pixels 52 then 53 are rendered. In the third scan line 67, pixels 54, 55, 56 are rendered.

Figure 2:
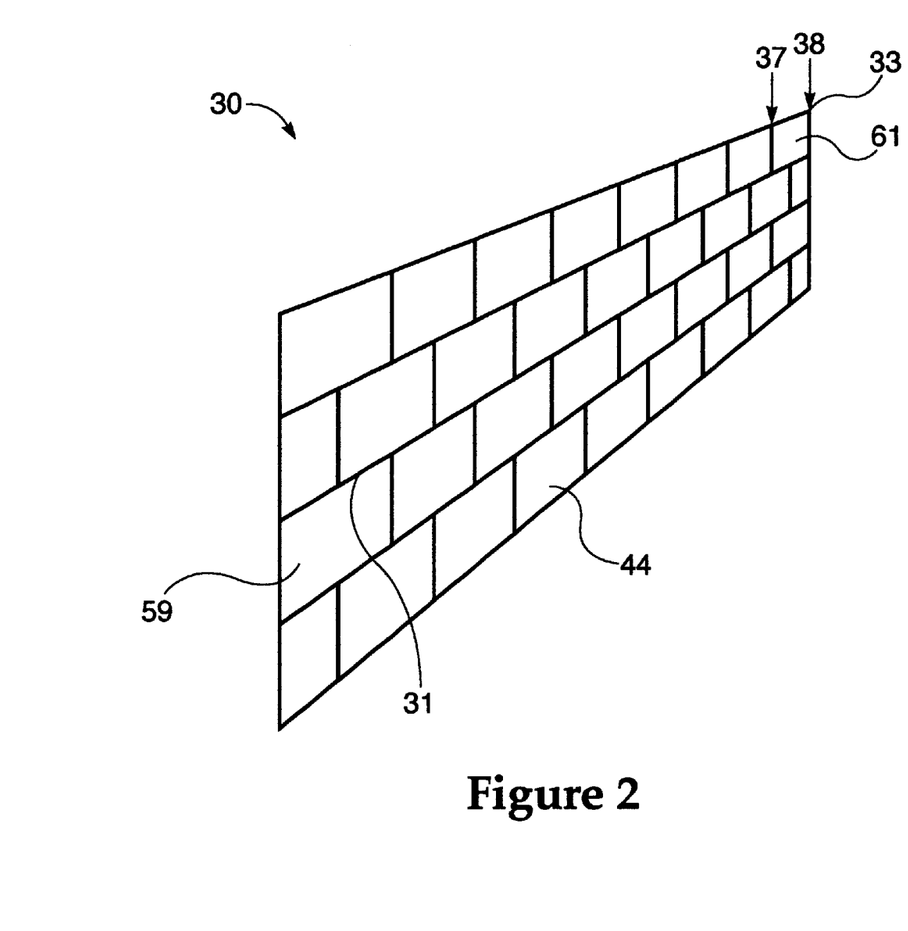
FIG. 2 is the exemplary wall of FIG. 1 drawn with brick texture maps to create the appearance of a brick wall.

Graphics processors, such as the GD5464 manufactured by Cirrus Logic, are capable of applying texture to polygons through a process referred to as texture mapping. Texture mapping techniques generally apply a bitmapped texture image to a polygon on the screen. A texture map typically is a two dimensional array of texture elements ("texels") that define a texture such as a brick, a carpet design, the grain of wood or any other texture that might be applied to an object on a computer screen. Referring now to FIG. 2, an exemplary brick texture 44 is applied to polygon 30 to create the appearance of a brick wall. The brick texture 44 is represented by a texture map. The texture map used in FIG. 2 may represent only a single brick which is applied repeatedly to polygon 30 to cover the entire polygon with bricks.

Using standard techniques, the texture map associated with the texture 44 is applied to polygon 30 in such a way to give the appearance of perspective to the brick wall of FIG. 2. To further improve upon the realism of the brick wall, the bricks that are close to the viewer (brick 59 for example) preferably are shown with greater detail than the bricks in the distance (brick 61). The detail includes the imperfections in the exposed surface of brick 59, the mortar between bricks and any other detailed desired. Such detail normally could not be seen in the distant brick 61. Accordingly, the graphics processor uses different versions of the brick texture map to account for differences in the level of detail in an object drawn with perspective. Each version is itself a texture map that includes a predetermined amount of detail. The texture map used to render brick 61 would not include the imperfections and other detail that could be seen in brick 59. Thus, a particular texture, such as the brick of FIG. 2, may include two or more texture maps representing the brick with varying levels of detail. MIP (multim in parvum) mapping is a technique by which the graphics processor selects a texture map with an appropriate level of detail to render a polygon. Using MIP mapping, the graphics processor switches between the various level of detail texture maps as the polygon is rendered.

The desire for sophisticated and realistic computer graphics requires the graphics hardware and software to deliver high performance. Performance becomes especially critical for computer games which typically include moving objects. Standard MIP mapping techniques for switching between various level of detail texture maps generally include computationally intensive operations and require numerous memory accesses that impair a graphics system's ability to deliver detailed, realistic, three-dimensional moving images.

Many graphics systems do not permit switching between level of detail texture maps while rendering the pixels in a screen object drawn with perspective. To apply varying level of detail texture maps to a screen object, such systems divide screen objects into numerous, smaller triangles so that a single level of detail texture map can be applied to each triangle. This type of system requires objects to be represented with more triangles than would otherwise be necessary placing increased demands on texture map memory storage.

Accordingly, it would be desirable to provide a graphics system that includes a MIP mapping scheme that requires relatively few memory accesses and computations. It would also be desirable to provide a system that permits switching between different levels of detail while rendering a single polygon. Such a system would provide increased performance while also providing high quality graphics.

SUMMARY OF THE INVENTION

A graphics system includes a graphics controller for rendering polygons with texture using an improved MIP mapping technique. The graphics controller includes a polygon engine for rendering the pixels in a polygon and a texture map engine for selecting texture elements (texels) from an appropriate texture map to be applied to the pixels rendered by the polygon engine. The texture map engine generates texel coordinate values from pixel coordinate values provided by the polygon engine. A set of texture maps is used to represent a single texture with each texture map in the set representing a different level of detail of texture. The graphics controller determines the appropriate level of detail texture map to use to increase speed and efficiency of the graphics system. The determination as to which level of detail texture map is appropriate is made by computing the area bounded by adjacent texels. The graphics controller generates u, v texel coordinates from each x, y pixel coordinate in the polygon and determines the areas from the cross products of vectors associated with pairs of adjacent texel coordinates.

The graphics controller compares the area bounded by adjacent texels with ranges of values and selects an appropriate texture map based on which range of values a cross product magnitude lies. Thus, the texture map with the greatest level of detail is selected if the area is within a first range and the texture map with the least level of detail is selected if the area is within a different range.

An embodiment of the invention includes software that calculates the area bounded by adjacent texel coordinates and compares that area to a range of area values. The software may run in the graphics processor or in a CPU that operates the host computer in which the graphics processor resides. The range of area values comprises a plurality of sub-ranges of values and a texture map is associated with each sub-range. In response to comparing the calculated area to a sub-range of area values, the software selects the texture map associated with the sub-range in which the area corresponds.

Thus, the present invention comprises a combination of features and advantages which enable it to overcome various problems of prior devices and methods. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF A PREFERRED EMBODIMENT

Figure 3:
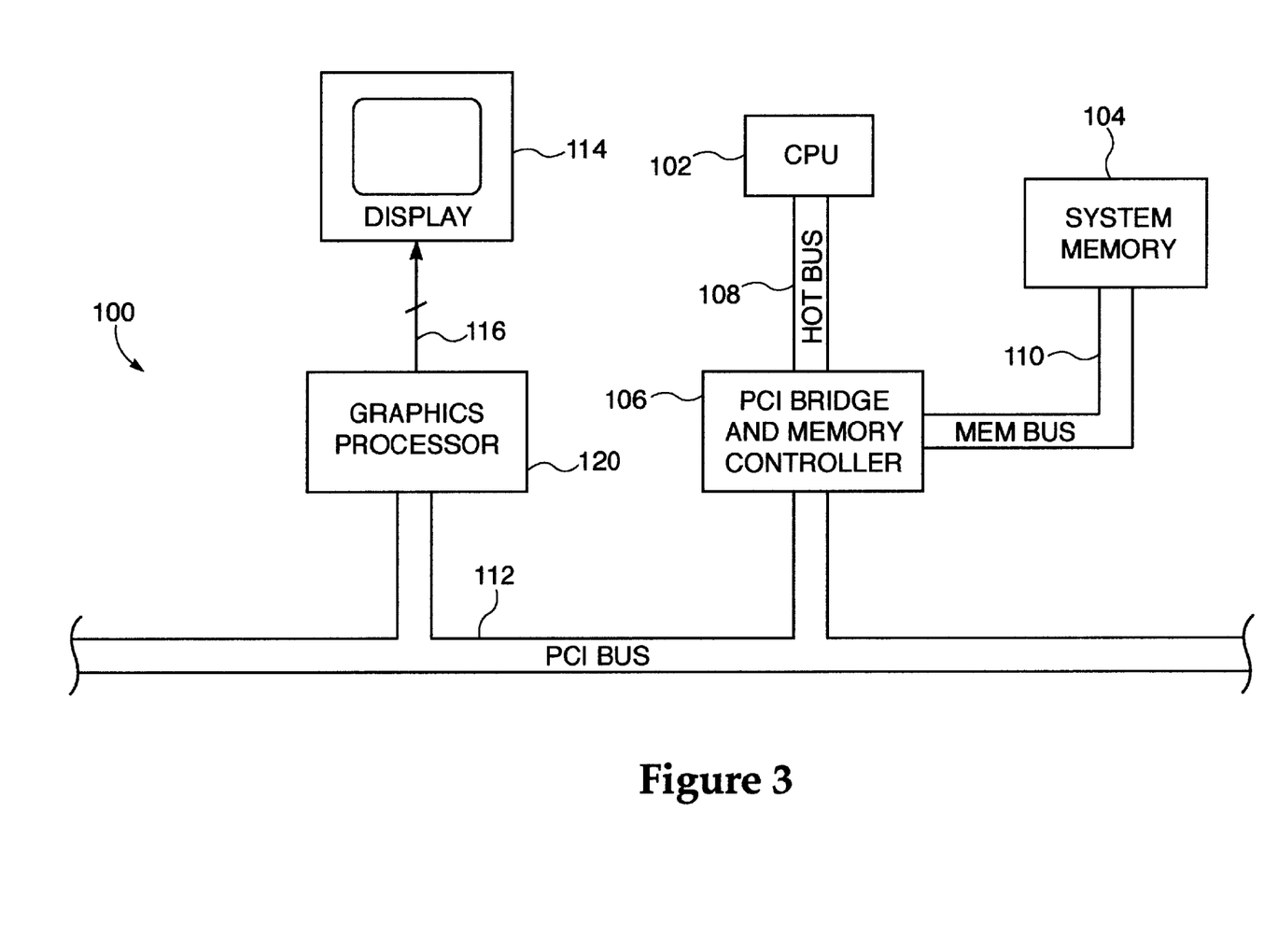
FIG. 3 is a general block diagram of a graphics system including a graphics processor in accordance with the preferred embodiment.

Referring now to FIG. 3, a computer system 100 constructed in accordance with a preferred embodiment generally includes CPU 102, system memory 104, a peripheral computer interconnect ("PCI") bridge and memory controller 106, a graphics processor 120, and a display 114. The CPU 102, system memory 104, PCI bridge 106 and display 114 preferably are known components. The CPU 102 may include any available processor such as the Pentium MMX®, K6®, or any other processor capable of operating a computer system in a fashion consistent with the preferred embodiment. The system memory 104 preferably includes standard dynamic random access memory ("DRAM"), synchronous DRAM, or any other suitable type of memory. The PCI bridge and memory controller may include any suitable off the shelf device or may be a custom design. Display 114 includes standard cathode ray tube ("CRT") displays, flat panel displays, or any other display device capable of displaying graphics.

The CPU 102 connects to the PCI bridge and memory controller 106 via a host bus 108 which includes address, data, and control lines for transferring data. The PCI bridge and memory controller 106 also connects to system memory 110 via a memory bus 110 which also includes address, data, and control lines suitable for transferring data between system memory 104 and PCI bridge and memory controller 108. The CPU 102 may initiate read and write cycles to system memory 104 by way of host bus 108, PCI bridge and memory controller 106, and memory bus 110 according to known techniques.

A system bus 112, preferably including a PCI bus, connects the PCI bridge and memory controller 106 to graphics processor 120. It should be recognized by those of ordinary skill in the art that other devices besides those shown in FIG. 3 may also connect to the PCI bus 112. Examples of other devices include extended memory cards, video cards, and network cards. Further, other bus standards besides the PCI bus, such as the advanced graphics part ("AGP") bus may be used as the system bus 112. If system bus 112 is implemented as an AGP bus, then the bridge and memory controller 106 is constructed so as to couple to an AGP bus. Graphics data in the form of a display list is transferred between CPU 102 and graphics processor 120 by way of host bus 108, PCI bridge and memory controller 106, and PCI bus 112. Once graphics data is received by graphics processor 120 over the PCI bus 112, the graphics processor 120 manipulates the data to provide appropriate signals over lines 116 to display 114 for displaying objects on the display.

Figure 4:
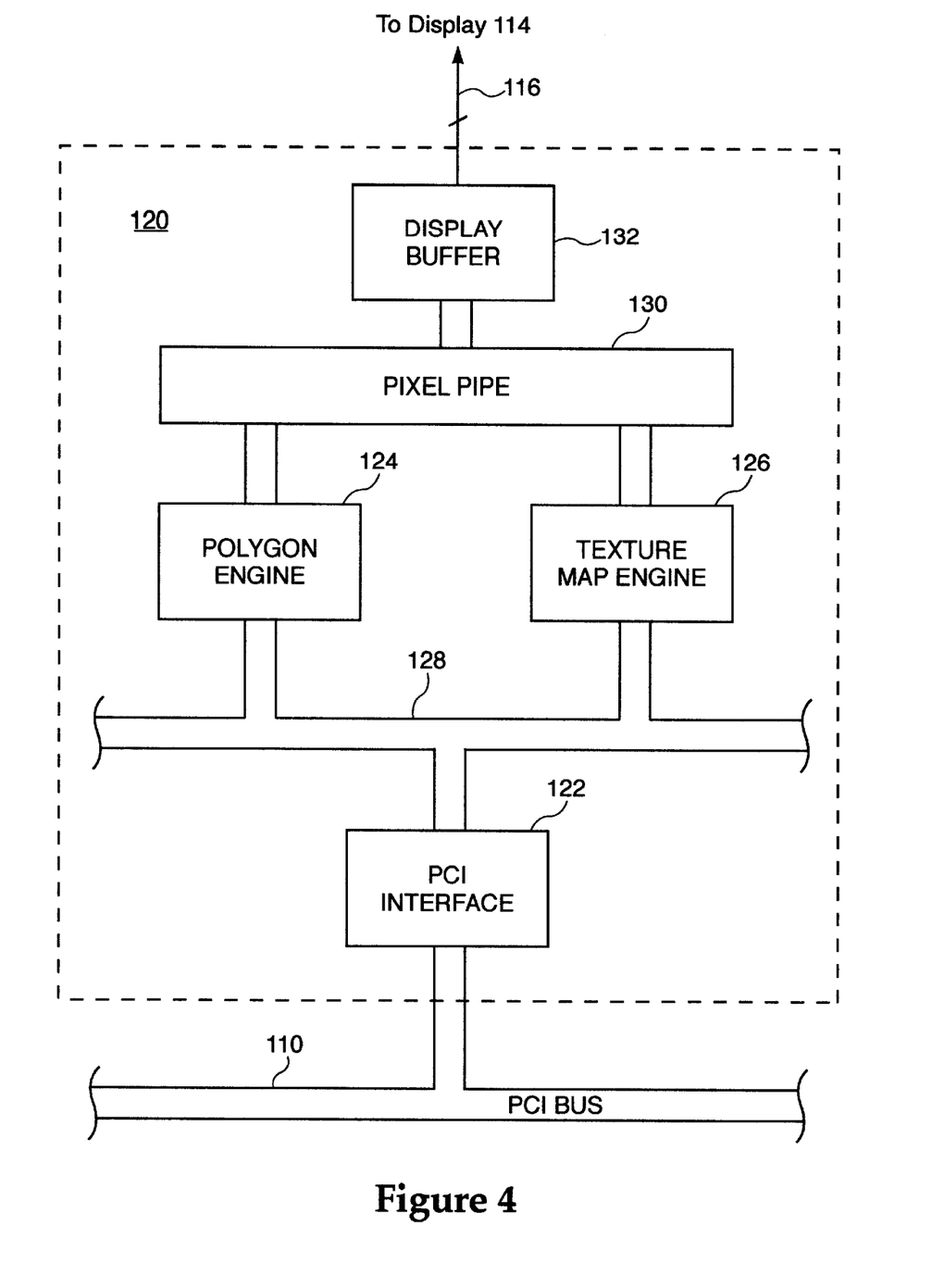
FIG. 4 is a more detailed schematic diagram of the graphics processor of FIG. 4 in accordance with the preferred embodiment.

Referring now to FIGS. 1 and 4, the graphics processor 120 of the preferred embodiment includes a PCI interface 122, a polygon engine 124, a texture map engine 126, a pixel pipe 130, and a display interface 132 The PCI interface 122, polygon engine 124, and texture map engine 126 couple together via bus 128. Pixel x,y addresses are provided over bus 128 to the texture map engine 126 and are used by texture map engine 126 to generate texture map addresses, as explained below. The polygon engine 124 and the texture map engine 126 couple to the pixel pipe 130. The display interface 132 uses information provided to it from the pixel pipe 130 to provide appropriate signals to the display 114 over lines 116.

The polygon engine 124 provides x,y pixel coordinates along with lighting and depth information to the pixel pipe 130. Concurrently, the texture engine 126 calculates a u,v coordinate for each pixel and fetches the texel color value (or simply "texel") from the appropriate texture map. The pixel pipe 130 perform basic 3D operations on the pixel color, depth, and texel values to generate a final color value to be applied to the pixel. This final color value is stored in the display buffer 132.

In accordance with a preferred embodiment, graphics processor 120 receives data in the form of a display list from the CPU 102 or system memory 104 via the PCI bus 112. The display list is stored in a register file in graphics processor 120 or memory (not shown) directly coupled to the graphics processor 120. The display list includes all information needed to draw a polygon. It is assumed each polygon includes an upper or main triangle (such as triangle 47 in FIG. 1) abutting a lower or opposite triangle (such as triangle 49). The values in the display list include the data needed to render both upper and lower triangles. Table I below includes an exemplary display list identifying the values that are included in the list (first column of Table I) and the description of each value (second column). References to X and Y values refer to the x,y coordinates of pixels on the display (referred to as x,y pixel space). References to U and V values refer to the coordinates of texels in a texture map which are identified as u,v coordinates. The u,v coordinate system of a texture map is referred to as u,v texture map space.

TABLE I

Display List.

| NAME | DESCRIPTION |
| --- | --- |
| X | Initial x pixel coordinate |
| Y | Initial y pixel coordinate |
| R | Initial Red value for initial x, y pixel |
| G | Initial Green value for initial x, y pixel |
| B | Initial Blue value for initial x, y pixel |
| ΔX MAIN | Main slope value: this value is added to the initial x coordinate on each step in y to generate the x starting point for each new ORTHO scan line. |
| Y COUNT | Top count : Bottom count concatenated. Determine the number of steps in y for the upper and lower portions of the triangle drawn. |
| X WIDTH MAIN | Initial upper width value. Width of the first ORTHO scan line in x of the upper (main) triangle |
| X WIDTH OPP | Initial bottom width value. Width of the first ORTHO scan line in x of the lower (opposite) triangle |
| ΔX WIDTH MAIN | Main width slope. This value is the amount by which the width of each scan line in x of the upper (main) triangle is adjusted on each step in y. |
| ΔX WIDTH OPP | Opposite width slope. This value is the amount by which the width of each scan line in x of the lower (opposite) triangle is adjusted on each step in y. |
| ΔR MAIN | Red main slope. This value is the amount by which the red color component start value for each scan line in x is adjusted on each step in y. |

TABLE I-continued

Display List.

| NAME | DESCRIPTION |
|---|---|
| ΔG MAIN | Green main slope. This value is the amount by which the green color component start value for each scan line in x is adjusted on each step in y. |
| ΔB MAIN | Blue main slope. This value is the amount by which the blue color component start value for each scan line in x is adjusted on each step in y. |
| ΔR ORTHO | Red ORTHO slope. This value is the amount by which the red color component is adjusted for each step in x along a scan line. |
| ΔG ORTHO | Green ORTHO slope. This value is the amount by which the green color component is adjusted for each step in x along a scan line. |
| ΔB ORTHO | Blue ORTHO slope. This value is the amount by which the blue color component is adjusted for each step in x along a scan line. |
| Z | Initial z pixel coordinate. |
| ΔZ MAIN | Z main slope value. Added to z to generate starting z coordinate for each new scan line. |
| ΔZ ORTHO | Z ORTHO value. This value is the amount by which the z coordinate is adjusted along a scan line on each step in x. |
| V | Initial v coordinate of first texel address in texture map being used. |
| U | Initial u coordinate of first texel address in texture map being used. |
| ΔV MAIN | V main slope value. Amount by which the v texel coordinate start value is adjusted on each step in y. |
| ΔU MAIN | U main slope value. Amount by which the u texel coordinate start value is adjusted on each step in y. |
| ΔV ORTHO | V ORTHO slope value. Amount by which the v texel coordinate is adjusted on each step in x. |
| ΔU ORTHO | U ORTHO slope value. Amount by which the u texel coordinate is adjusted on each step in x. |
| ΔV2 MAIN | Amount by which the ΔV MAIN value is adjusted per main slope step. |
| ΔU2 MAIN | Amount by which the ΔU MAIN value is adjusted per main slope step. |
| ΔV2 ORTHO | Amount by which the ΔV ORTHO is adjusted per ortho step. |
| ΔU2 ORTHO | Amount by which the ΔU ORTHO is adjusted per ortho step. |

It should be recognized that a display list may, and often will, include additional values. Thus, the values in the display list of Table I are exemplary only and are not exhaustive of all the values included in a typical display list.

The graphics processor 120 (FIG. 3) uses the values in the display list in Table I to draw a polygon and apply texture. How the graphics processor 120 renders a polygon with texture will now be described with reference to triangle 40 (FIG. 1). Referring to FIG. 1 and Table I, triangle 40 preferably is divided into two portions—an upper or main triangle 47 and a lower or opposite triangle 49 separated from main triangle 47 by dashed line 48. For purposes of simplicity, the following discussion assumes the triangle 40 is drawn from top to bottom.

Triangle 40 is drawn in a series of horizontal ORTHO scan lines in which each scan line includes one or more pixels. Because the ORTHO scan lines are horizontal, only the x coordinate changes from one pixel in the scan line to the next. Further, the polygon engine 124 preferably increments the x coordinate by one as the graphics processor renders each pixel in succession along an ORTHO scan line. To draw the upper or main triangle 47, the graphics processor needs to know or calculate the coordinate of the first pixel in the triangle (pixel 41, for example), the coordinate of the first pixel in each ORTHO scan line, the number of pixels in each scan line, and the number of scan lines in the triangle. These values can be determined from the display list in Table I. The coordinate of the initial pixel is X, Y. The coordinate of the first pixel in each successive scan line is calculated by adding $_\Delta$X MAIN to X. It should be recognized that $_\Delta$X MAIN may be a positive or negative number depending on the slope of the line on which the first pixels in each ORTHO scan line lie. Thus, if the line on which the first pixels lie slopes down and to the left (as is the case for the main slope line 45 in FIG. 1), then $_\Delta$X MAIN is a negative number because the x,y coordinates axes in the preferred embodiment have x coordinates increasing from left to right (y coordinates increase from the top of the display to the bottom). Thus, adding a negative value to an x coordinate produces an x coordinate to left on the display. Conversely, if the line on which the first pixels lie slopes down and to the right, $_\Delta$X MAIN will be a positive number. If the line is vertical, $_\Delta$X MAIN has a value of 0.

The number of pixels in each ORTHO scan line is calculated by adding $_\Delta$X WIDTH MAIN to the width (i.e., number of pixels in the x direction) of the previous scan line. For example, the $_\Delta$X WIDTH MAIN value for triangle 47 is 1. The width of the first scan line 63 (X WIDTH MAIN) is 1 because there is only 1 pixel (pixel 41) in the first scan line 63. Adding a $_\Delta$X WIDTH MAIN value of 1 to the X WIDTH MAIN value of 1 provides a width of the second scan line 65 of 2. Thus, there are 2 pixels in the second scan line (pixels 52, 53). The graphics processor then adds the $_\Delta$X WIDTH MAIN value of 1 to the width of the second scan line (2 pixels) and thereby determines that there are 3 pixels in the third scan line 67 (pixels, 54, 55, 56).

The number of scan lines in a triangle is provided by the Y COUNT value which includes the number of scan lines in both the upper (main) triangle and lower (opposite) triangle. The portion of the Y COUNT value representing the number of scan lines in the main triangle preferably is loaded into a counter and decremented by one for each ORTHO scan line drawn. When the counter reaches its terminal count, the graphics processor has completed drawing the main triangle.

After the main triangle 47 is drawn, the opposite triangle 49 is then drawn using the same technique. The first pixel to be drawn preferably is pixel 39 and the width of the first scan line is the number of pixels along dashed line 48.

Figure 5:
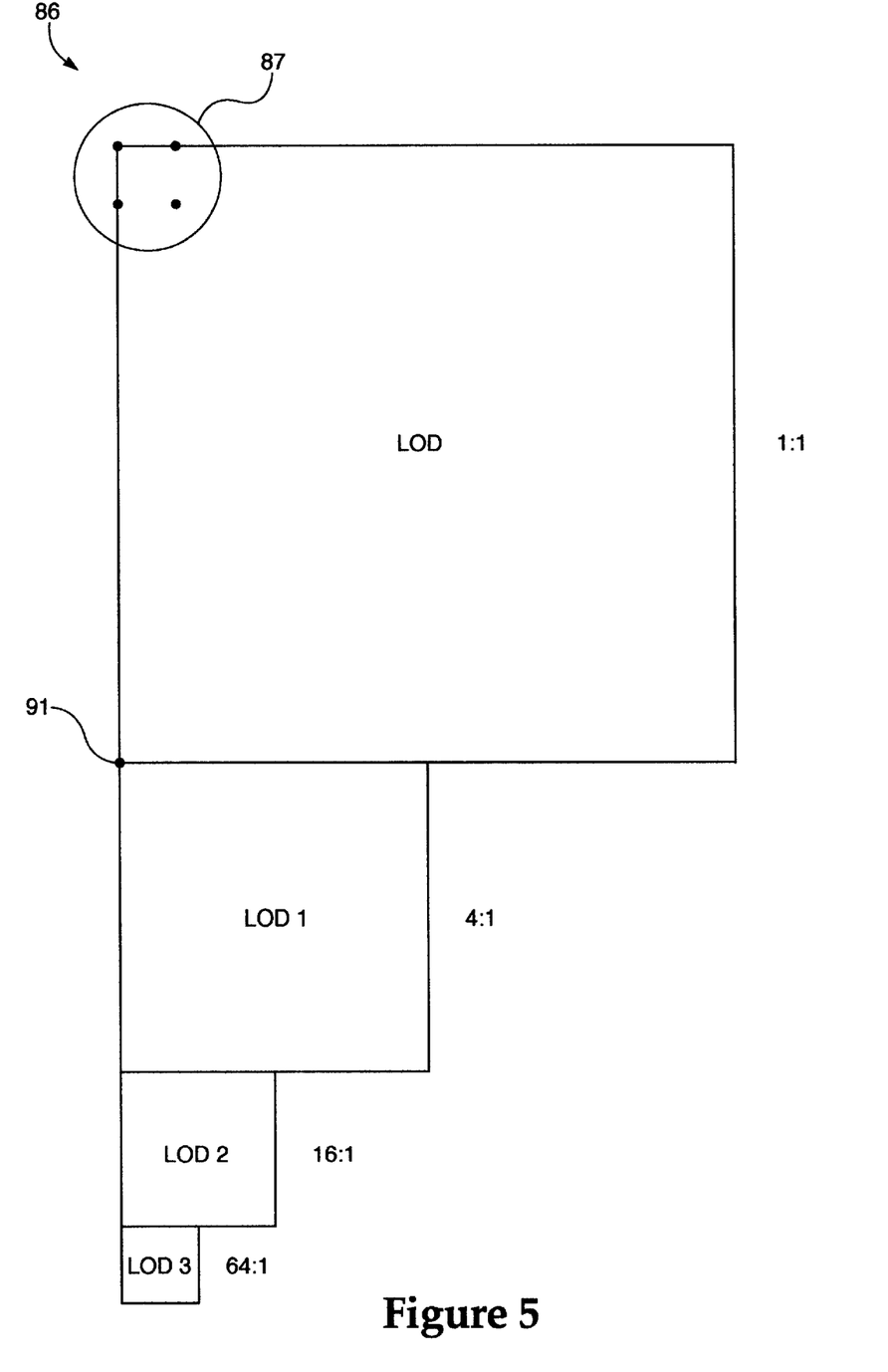
FIG. 5 shows multiple texture maps with varying levels of detail used to render polygons.

In accordance with a preferred embodiment, the texture map engine 126 applies texels to each pixel in the triangles drawn by polygon engine 124. The texels are stored in a texture map and are accessed using values in the display list in Table I above. Because polygons are often drawn with perspective, a set of texture maps in which each texture map has a particular level of detail that is different from the other texture maps in the set is used to render the polygon. Referring now to FIG. 5, set of texture maps 86 preferably includes four levels of detail ("LDO")—LOD0, LOD1, LOD2, and LOD3. Each LOD is itself a texture map. All four LOD's are maps of the same basic texture differing only by the amount of detail in each map. LOD0 provides the most level of detail of any of the maps and is used for those portions or polygons that are close to viewer in which maximum detail is preferred (such as brick 59 in FIG. 2). LOD1 provides the next most detail. LOD2 provides the next most level of detail after LOD0 and LOD1. Finally, LOD3 provides the least amount of detail and is used for distant portions of a polygon in which little detail is preferred (such as brick 61 in FIG. 2). The LOD's may be any size desired. In accordance with a preferred embodiment, LOD0 includes 1024 rows and 1024 columns of texel values. Each texel value is represented by a combination of red, green, and blue color values and is one or more bytes long.

It should be apparent that in x,y pixel space polygons are drawn by providing color values to each and every pixel in an ORTHO scan line, incrementing the y coordinate to the next scan line and repeating the process. The texture map engine generates u,v, texel coordinates. The texel from the texture map associated with the u,v coordinates is then selected to be applied to the x,y pixel coordinate. Any other scheme for selecting texels from a texture map, such as bilinear averaging, is also consistent with the preferred embodiment.

Unlike rendering pixels in x,y space in which each pixel is rendered, in u,v texture map space the texture map engine 126 may skip texels as it converts pixel coordinates to texel coordinates. Referring again to FIGS. 2 and 5, the foreground brick 59 is rendered using LOD0 for maximum detail. Thus, all 1024×1024 (1M) texels in LOD0 may be used to render brick 59. Brick 61 in the distant is drawn smaller than brick 59 to provide the illusion of perspective. Thus, there are fewer pixels used to render brick 61 than brick 59. Because there may be many more texels in LOD0 than pixels in brick 61, not all of the texels from LOD0 will be selected by the texture map engine 126 when converting x,y coordinate to u,v coordinates. It this is preferable to use a reduced or compressed version of LOD0 to render brick 61. LOD1–LOD3 provide compressed versions of LOD0, varying by the amount of compression. LOD1 preferably is one-fourth of the size of LOD0 and includes 512 rows and 512 columns of texels. As such, LOD1 represents a four to one "4:1") compression of LOD0. That is, LOD1 includes the same basic texture as LOD0 (albeit with less detail) in a texture map one-fourth the size of LOD0. The 4:1 compression is achieved by averaging four pixels in LOD0 (such as pixels 87 in FIG. 5) to produce one pixel in LOD1, although other techniques for generating the LOD's are possible. LOD2 and LOD3 also include the same basic texture as LOD0 with varying degrees of compression. LOD2 includes 256 rows and columns of texels and thus is one sixteenth of the size of LOD0 (a compression of 16:1). Finally, LOD3 is one sixty-fourth of the size of LOD0 (64:1 compression) and includes 128 rows and columns of texels.

Selecting an appropriate LOD provides higher quality images and is more efficient than using a texture map with maximum detail. Using a texture map with more detail than that necessary for the polygon to be rendered often makes the polygon appear to sparkle resulting in an unrealistic appearance. Additionally, texels are normally read from system memory in a block of data that is stored in cache memory (not specifically shown) according to known techniques. In accordance with the preferred embodiment, computer system 100 reads an 8×8 block of 64 texels from system memory 104 when a texel value is desired and stores the 64 texel block in high speed cache memory. When the next texel is needed from the texture map, there is a substantial likelihood that the needed texel is one of the 64 texels already stored in cache memory (a cache "hit"). Accesses to cache memory occur at a much higher speed than accesses to standard system memory 104, thereby speeding up the graphics process. If the next texel required is not one of the texels already stored in cache memory (a cache "miss"), a new 8×8 block of 64 texels must be read, and cached, to access the required texel value. Thus, using LOD0 when a smaller, more compressed LOD is appropriate slows the texture mapping process because a system memory access may be required for every texel needed. Instead, the graphics processor 120 increases the probability of a cache hit by using an appropriately sized LOD.

Figure 6:
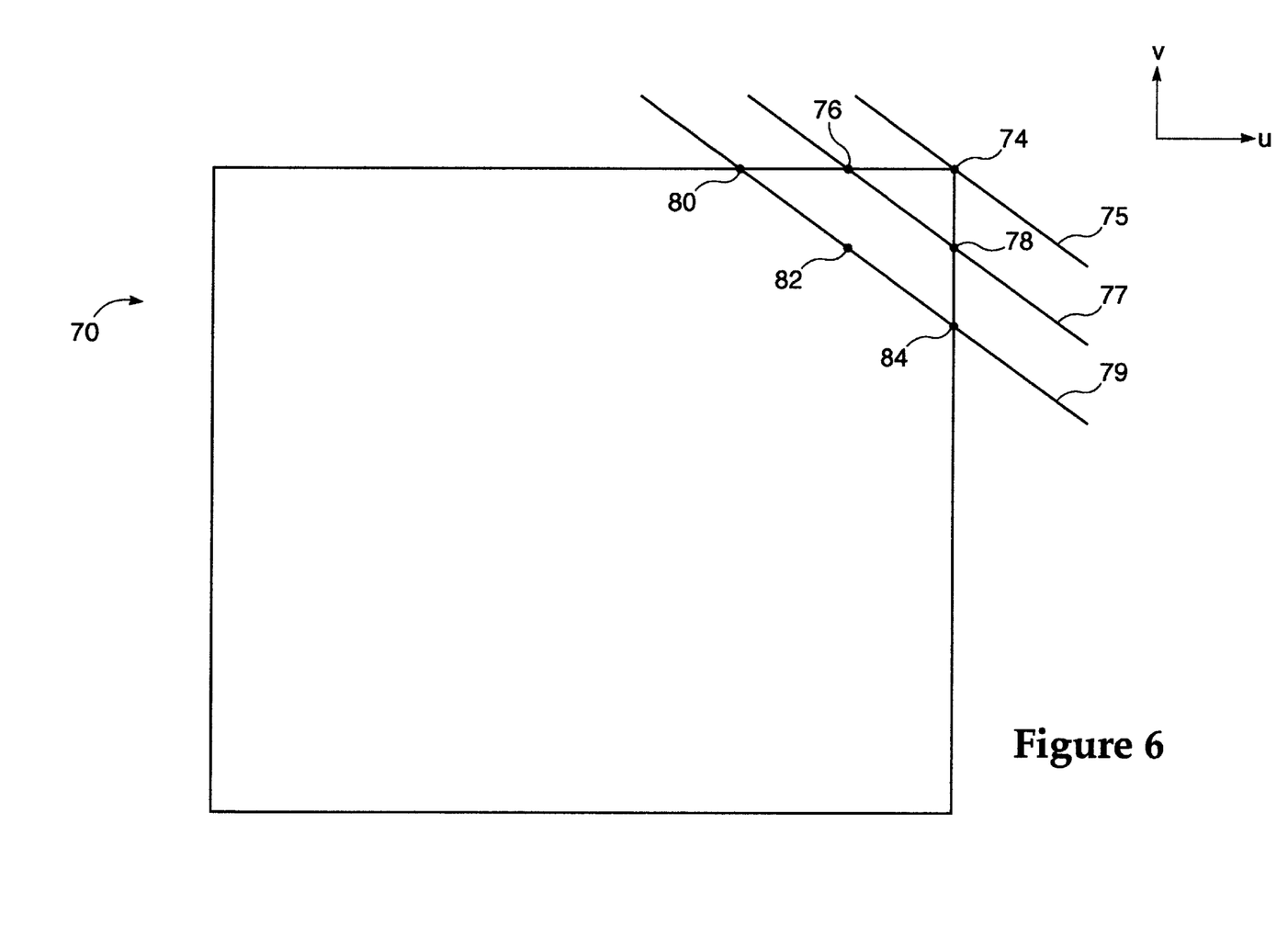
FIG. 6 shows an exemplary texture map and the selection of texels used to render a polygon.

Referring now to FIGS. 1 and 6, texture map engine 126 uses texels from an exemplary texture map 70 to apply to triangles 47, 49. It should be apparent that selection of texels in u,v space from texture map 70 does not necessarily proceed along horizontal rows as is the case for rendering polygons in x,y space. For example, if texture map 70 is applied to polygon 40, texel 74 may be the first texel selected to be applied to the first pixel rendered (pixel 41). Further, texels 76, 78, 80, 82, 84 would be applied to pixels 52, 53, 54, 55, 56, in order. Thus, ORTHO scan lines in u,v space (such as scan lines 75, 77, 79) may lie at arbitrary angles.

Unlike polygon rendering in which only the x coordinate changes from one pixel to the next along an ORTHO scan line in x,y pixel space, both the u and v coordinate may change from one texel to the next along a single ORTHO scan line in texture space. The U and V values from Table I provide the coordinate of the first texel to be used from the texture map. The $_\Delta$U ORTHO and $_\Delta$V ORTHO values are used to calculate the u,v coordinate for each texel along an ORTHO scan line. Further, the $_\Delta$U2 ORTHO and $_\Delta$V2 ORTHO values are used to change the $_\Delta$U ORTHO and $_\Delta$V ORTHO values allowing for perspective correct texture mapping. The $_\Delta$U MAIN and $_\Delta$V MAIN values are used to compute the u,v coordinate for the first texel in a particular ORTHO scan line. Perspective correct texture mapping is further implemented by using the $_\Delta$U2 MAIN and $_\Delta$V2 MAIN values to change the $_\Delta$U MAIN and $_\Delta$V MAIN values as the main slope is traversed. The MIP mapping techniques of the present invention used the $_\Delta$U ORTHO, $_\Delta$V ORTHO, $_\Delta$U MAIN, $_\Delta$V MAIN values to select an appropriate LOD as explained below.

Figure 7:
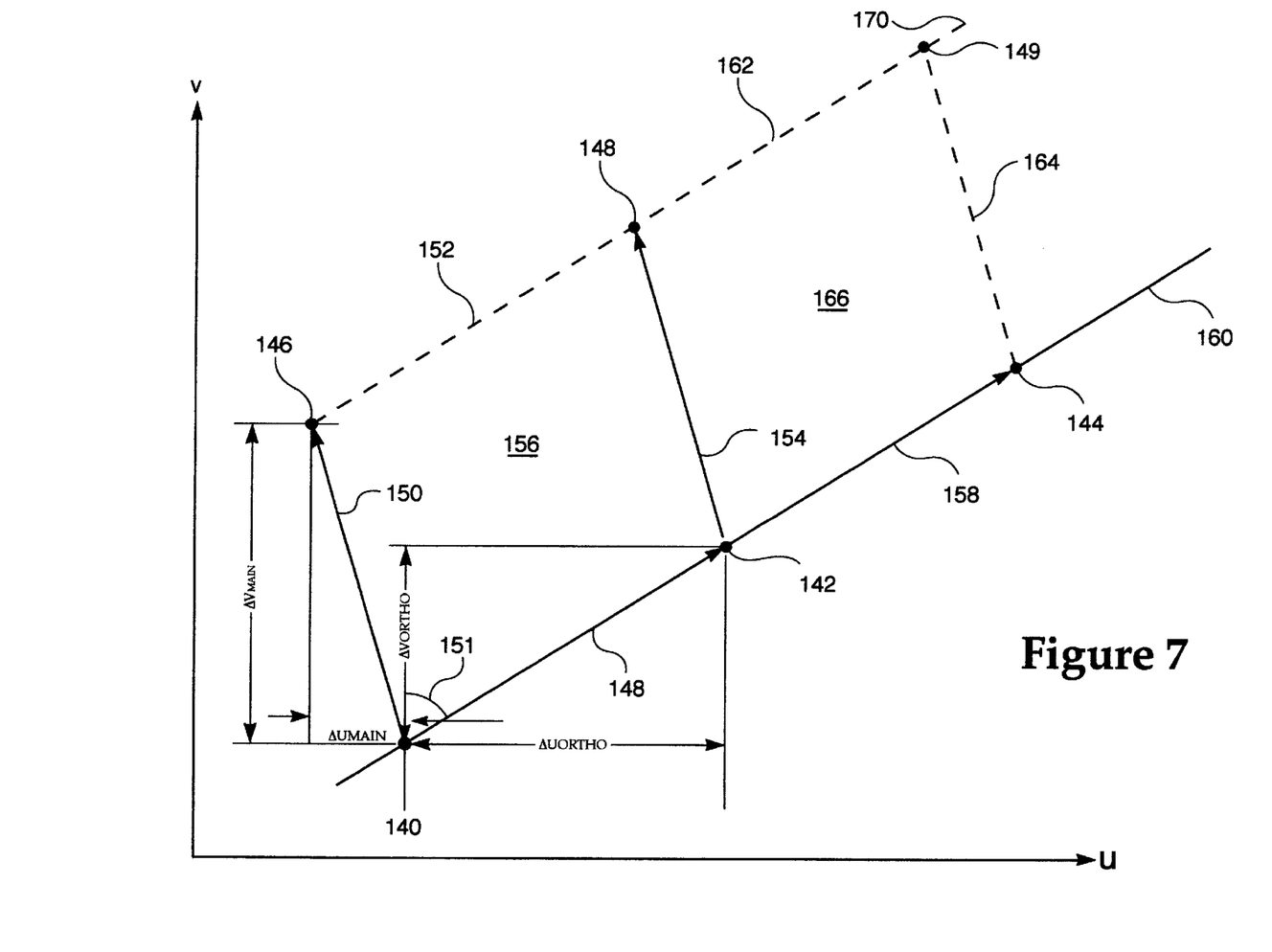
FIG. 7 shows the MIP mapping technique of the preferred embodiment to determine which of a set of texture maps with varying levels of detail to use when rendering portion of a polygon.

Referring now to FIG. 7, exemplary texels 140, 142, 144, 146, 148 from a texture map are shown in relation to the u and v axes. Texels 140, 142, 144 are texels along ORTHO scan line 160 and texels 146, 148 are texels along ORTHO scan line 170. In accordance with interpolation technique explained above, the u,v address of texels and the delta values to the next texel in both the ortho and main slopes are available. Once the coordinate of texel 140 is determined by the texture map engine 126, the coordinate of texel 142 can be calculated from the $_\Delta$U ORTHO and $_\Delta$V ORTHO values. Similarly, the $_\Delta$U MAIN and $_\Delta$V MAIN values are used to calculate the coordinate of texel 146. In this manner, texel coordinate values for texels 144 and 148 can be calculated once texel coordinate 142 is determined. Moreover, given one texel coordinate from a texture map, the two adjacent coordinates, as shown in FIG. 7, can be calculated given the $_\Delta$U ORTHO, $_\Delta$V ORTHO, $_\Delta$U MAIN, and $_\Delta$V MAIN values.

Referring still to FIG. 7 and in accordance with a preferred embodiment, a uv area is computed for groups of three texels in which two of the three texels lie on a common ORTHO scan line and the third texel is on a different scan line. Texel 140, 142, and 146, for example, define a uv area 156 bounded by lines 148, 150, 152, 154. Similarly, uv area 166 defines the area associated with texels 142, 144, 148 and is the area bounded by lines 158, 154, 162, 164. The size of the uv area is proportional to the distance between texels selected by the texture map engine 126 and is thus related to the amount of compression that is appropriate. Thus, texture map engine 126 computes these uv areas and uses the uv areas to select the appropriate LOD. Once an appropriate LOD is selected, graphics processor 120 uses standard texture mapping techniques to apply texels from the selected LOD to the polygon.

If the uv area is between 0 and 4, the texture map engine 126 selects LOD0. If the uv area is between 4 and 16, the texture map engine 126 selects LOD1 with its 4:1 compression. If the uv area is between 16 and 64, the texture map engine 126 selects LOD2 with its 16:1 compression. Finally, if the uv area is greater than 64, the texture map engine 126 selects LOD3 with its 64:1 compression. It should be recognized, however, that the uv area ranges for which each LOD is to be used may be of any desired size.

Although numerous techniques known to those of ordinary skill in the art may be used to compute the uv areas, the following technique is preferred because of its simplicity and low computational overhead (few memory accesses and calculations). An arrow or vector is assigned to the texels as shown in FIG. 7. Vector 128 begins at texel 140 and ends at texel 142. Vector 150 also begins at texel 140 and ends at texel 146. The uv area 156 is determined from the "cross product" (also referred to as the "vector product") of vectors 148 and 150. The cross product of two vectors (P and Q, for example) typically is represented as P×Q. The cross product of vectors P and Q results in a third vector V which points in a direction perpendicular to the plane defined by the two vectors P and Q (i.e., into or out of the page). The magnitude or length of the resulting vector V is the product of the magnitudes of vectors P and Q and the sine of the angle formed between the vectors. Thus, the uv area 156 can be calculated as the length of vector 148 times the length of vector 150 times angle 151.

Figure 8:
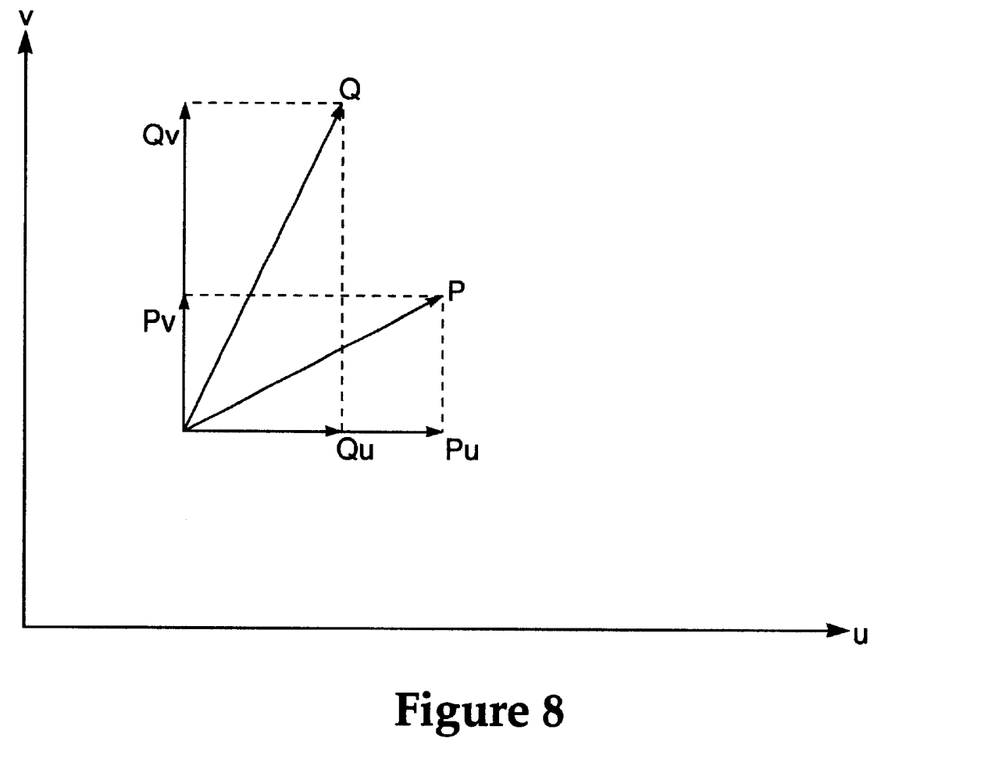
FIG. 8 is a graph showing exemplary vectors represented by their rectangular coordinates.

Referring to FIG. 8, two vectors P and Q are shown represented by their rectangular components $P_u$ and $P_v$ and $Q_u$ and $Q_v$. The magnitude of the cross product of the vectors P and Q may alternatively be calculated as:

$$V = P_x Q_y - P_y Q_x \qquad (1)$$

Where V is the magnitude of the cross product. Referring to FIG. 7, the magnitude of the vector resulting from the cross product of vectors 148 and 150 (i.e., the uv area 156) thus is calculated as:

$$uv\ area = (_\Delta V\ MAIN *_\Delta U\ ORTHO) - (_\Delta U\ MAIN *_\Delta V\ ORTHO) \qquad (2)$$

In accordance with a preferred embodiment, each uv area is calculated in software which may run in either the graphics processor 120 or CPU 102. The following lines of code are exemplary of one way to calculate uv area (identified below as $uv_{13}area$) in software.

$$xproda = (_\Delta V\ MAIN *_\Delta U\ ORTHO) \& 0x0000\mathit{ffff}, \qquad (3)$$

$$xprodb = (_\Delta U\ MAIN *_\Delta V\ ORTHO) \& 0x0000\mathit{ffff}, \qquad (4)$$

$$uv_{13}area = xproda - xprodb; \qquad (5)$$

$$if(uv\_area \& 0x80000000) uv_{13}area = \sim uv_{13}area; \qquad (6)$$

In lines (3) and (4), the two terms in parentheses from equation (2) are calculated as xproda and xprodb, respectively. The term xprodb is subtracted from xproda in step (5). Finally, in step (6), the result of step (5) is examined to determine if it is a negative number. If so, the sign of $uv_{13}area$ is reversed to ensure $uv_{13}area$ is always a positive number. This step is commonly referred to as taking the absolute value of a number. It should be recognized that other techniques for taking the absolute value of a number are possible and consistent with the preferred embodiment.

The software then compares the $uv_{13}area$ result from code line (6) to a range of values as illustrated with following lines of code:

```
if (uv_area < 0x00400) //< 4                          (7)
{                                                      (8)
    if(!lod0_npo2_en)                                  (9)
        lod = 0;                                       (10)
    lod_location = lod0_location;                      (11)
    lod_x = lod0_x_postion;                            (12)
    lod_y = lod0_y_position;                           (13)
    lod_offset = lod0_tiled_offset;                    (14)
}                                                      (15)
else if((uv_area >= 0x00400) &&                        (16)
    (uv_area < 0x01000)) //4
{                                                      (17)
    if(!lod1_npo2_en)                                  (18)
        lod = 1;                                       (19)
    lod_location = lod1_location;                      (20)
    lod_x = lod1_x_position;                           (21)
    lod_y = lod1_y_position;                           (22)
    lod_offset = lod1_tiled_offset;                    (23)
}                                                      (24)
else if((uv_area >= 0x01000) &&                        (25)
    (uv_area < 0x04000)) //16
{                                                      (26)
    if(!lod2_npo2_en)                                  (27)
        lod = 2;                                       (28)
    lod_location = lod2_location;                      (29)
    lod_x = lod2_x_position;                           (30)
    lod_y = lod2_y_position;                           (31)
    lod_offset = lod2_tiled_offset;                    (32)
}                                                      (33)
else if(uv_area >= 0x04000) //64                       (34)
{                                                      (35)
    if(!lod3_npo2_en)                                  (36)
        lod = 3;                                       (37)
    lod_location = lod3_location;                      (38)
    lod_x = lod3_x_position;                           (39)
    lod_y = lod3_y_position;                           (40)
    lod_offset = lod3_tiled_offset;                    (41)
}                                                      (42)
```

In steps (7), (16), (25), and (34), the uv area value is compared to a range of values. Step (7) determine whether the uv area is less than 4). Steps (16) and (25) determines whether the uv area is between 4 and 16 (step (16)) or between 16 and 24(step (25)). Finally, in step (34), the software determines whether the uv area is greater than 64. The lines of code immediately following each comparison step (7), (16), (25), (34) select the LOD associated with the decision step. Thus, lines of code (8)–(15) select LOD0. Similarly, code lines (17)–(24) select LOD1 and lines (26) –(33) select LOD2. Lines (35)–(42) select LOD3. Each set of LOD selection instructions include loading the memory location of each LOD (instructions (11), (20), (29), (38)) and initializing x and y pointers to the LOD (instructions (12)–(13), (21)–(22), (30)–(31), (39)–(40)). Other instructions, such as initializing offset values (instructions (14), (23), (41)) or instructions not listed above, may also be included in the software.

In sum, the size of the uv area dictates which LOD texture map to use to provide the appropriate level of detail. Thus, the preferred embodiment provides an efficient technique to switch between LOD's. Because a uv area is calculated for each texel used from the texture map, the graphics processor may switch repeatedly between LOD's in rendering a polygon. Once the appropriate texture map is selected, the graphics processor uses known texture mapping techniques to apply a texel value from the appropriate LOD to the polygon being rendered.

The MIP mapping technique implemented by the graphics processor 120 and/or software requires few system memory accesses and computations. In fact, the values used in equation (2) are already provided to the graphics processor in the display list (see Table I). Further, only two multiply operations and one subtraction is required to compute each uv area defined by equation (2).

Numerous variations and modifications will become apparent to those skilled in the art once the above disclosure is fully appreciated. It is intended that the following claims be interpreted to embrace all such variations and modifications.

We claim:

1. A method of selecting a texture map from a set of texture maps, comprising:

(a) calculating texel coordinates based on a $\Delta U$ ORTHO value, a $\Delta V$ ORTHO value, a $\Delta U$ MAIN value, and a $\Delta V$ MAIN value;

(b) calculating an area bounded by a plurality of texel coordinates; and (c) selecting a texture map based on said area.

2. A method of selecting a texture map from a set of texture maps comprising:

a) calculating texel coordinates based on a $^\Delta U$ ORTHO value, a $^\Delta V$ ORTHO value, a $^\Delta U$ MAIN value, and a $^\Delta V$ MAIN value;

b) calculating an area bound by a plurality of texel coordinates by multiplying said $^\Delta V$ MAIN value by said $^\Delta U$ ORTHO value to produce a first product; and c) selecting a texture map based on said area.

3. The method of claim 2, wherein said area corresponds to one of a plurality of ranges of area values and step (c) includes selecting a texture map based on the particular range of values to which said area corresponds.

4. The method of claim 2 wherein step (b) further includes multiplying said $^\Delta U$ MAIN value by said $^\Delta V$ ORTHO value to produce a second product.

5. The method of claim 4 wherein step (b) further includes calculating a difference between said first and second products.

6. The method of claim 5 wherein step (b) further includes calculating an absolute value of the difference between said first and second products.

7. A computer readable storage medium for storing an executable set of software instructions which, when inserted into a host computer system, is capable of controlling the operation of the host computer, said software instructions being operable to selecting a texture map from a plurality of texture maps, said software instructions including:

means for calculating texel coordinates based on a $\Delta U$ ORTHO value, a. $\Delta V$ ORTHO value, a $\Delta U$ MAIN value, and a $\Delta V$ Main value;

means for calculating an area bounded by a plurality of texel coordinates; and means for selecting a texture map based on said area.

8. A computer readable storage medium for storing an executable set of software instructions which, when inserted into a host computer system, is capable of controlling the operation of the host computer, said software instructions being operable to select a texture map from a plurality of texture maps, said software instructions including:

means for calculating texel coordinates based on a $^\Delta U$ ORTHO value, a $^\Delta V$ ORTHO value, a $^\Delta U$ MAIN value, and a $^\Delta V$ MAIN value;

means for calculating an area bounded by a plurality of texel coordinates by multiplying said $^\Delta V$ MAIN value by said $^\Delta U$ ORTHO value to produce a first product, said area corresponds to one of a plurality of ranges of area values; and means for selecting a texture map based on said area based on the particular range of values to which said area corresponds.

9. The invention of claim 8 wherein said means for calculating said area further includes a means for multiplying said $^\Delta U$ MAIN value by said $^\Delta V$ ORTHO value to produce a second product.

10. The invention of claim 9 wherein said means for calculating said area further includes a means for calculating a difference between said first and second products.

11. The invention of claim 10 further including a means for calculating an absolute value of the difference between said first and second products.

12. A method of selecting a texture map from a set of texture maps, comprising:

(a) calculating texel coordinates based on an amount by which a first texel coordinate is adjusted in each step in x, an amount by which a second texel coordinate is adjusted in each step in x, an amount by which the first texel coordinate value is adjusted in each step in y, and an amount by which the second texel coordinate value is adjusted in each step in y;

(b) calculating an area bounded by a plurality of texel coordinates; and (c) comparing said area to a range of area values; and (d) selecting a texture based step (c).

13. A method of selecting a texture map from a set of texture maps comprising:

(a) calculating texel coordinates based on a $\Delta U$ ORTHO value, a $\Delta V$ ORTHO value, a $\Delta U$ MAIN value, and a $\Delta V$ MAIN value;

(b) calculating an area bounded by a plurality of texel coordinates, wherein said area corresponds to one of a plurality of ranges of area values; and (c) selecting a texture map based on the particular range of values to which said area corresponds.

14. The method of claim 13, wherein said range of area values includes a plurality of sub-ranges.

15. The method of claim 14 wherein step (c) includes comparing said area to said plurality of sub-ranges.

16. The method of claim 15 wherein step (c) further includes determining to which sub-range said area corresponds.

17. The method of claim 16 wherein a texture map is associated with each sub-range and step (d) includes selecting the texture map associated with the sub-range to which said area corresponds.

18. The method of claim 17 wherein in step (d) further includes initializing pointers to said texture map associated with the sub-range to which said area corresponds.

19. A method of selecting a texture map from a set of texture maps, comprising:

(a) calculating texel coordinates based on an amount by which a first texel coordinate is adjusted in each step x, an amount by which a second texel coordinate is adjusted in each step in x, an amount by which the first texel coordinate value is adjusted in each step in y, and an amount by which the second texel coordinate value is adjusted in each step in y;

(b) calculating an area bounded by a plurality of texel coordinates; and (c) comparing said area to a range of area values; and (d) selecting a texture based step (c).

20. A computer readable storage medium for storing an executable set of software instructions which, when inserted into a host computer system, is capable of controlling the operation of the host computer, said software instructions being operable to select a texture map from a plurality of texture maps, said software instructions including:

means for calculating texel coordinates, which includes a means for calculating texel coordinates based on a $\Delta U$ ORTHO value, a $\Delta V$ ORTHO value, a $\Delta U$ MAIN value, and a $\Delta V$ MAIN value;

means for calculating an area bounded by a plurality of texel coordinates; and     means for selecting a texture map based on said area, wherein said area corresponds to one of a plurality of ranges of area values and said means for selecting a texture map includes a means for selecting a texture map based on the particular range of values to which said area corresponds.

21. The invention of claim 20, wherein said area corresponds to one of a plurality of ranges of area values and said means for selecting a texture map includes a means for selecting a texture map based on the particular range of values to which said area corresponds.

22. The invention of claim 20, wherein said range of area values includes a plurality of sub-ranges.

23. The invention of claim 22 wherein said means for comparing said area to a range of area values includes a means for comparing said area to said plurality of sub-ranges.

24. The invention of claim 22, wherein said means for comparing said area to a range of area values further includes a means for determining to which sub-range said area corresponds.

25. The invention of claim 24 wherein a texture map is associated with each sub-range and said means for selecting a texture map based on said means for comparing said area to said range of area values includes a means for selecting the texture map associated with the sub-range to which said area corresponds.

26. The method of claim 25 wherein said means for selecting a texture map based on said means for comparing said area to said range of area values further includes a means for initializing pointers to said texture map associated with the sub-range to which said area corresponds.

* * * * *